Feb. 5, 1946.   A. C. DAMAN   2,393,975
METHOD OF TREATING CEREAL GRAINS
Filed March 27, 1941
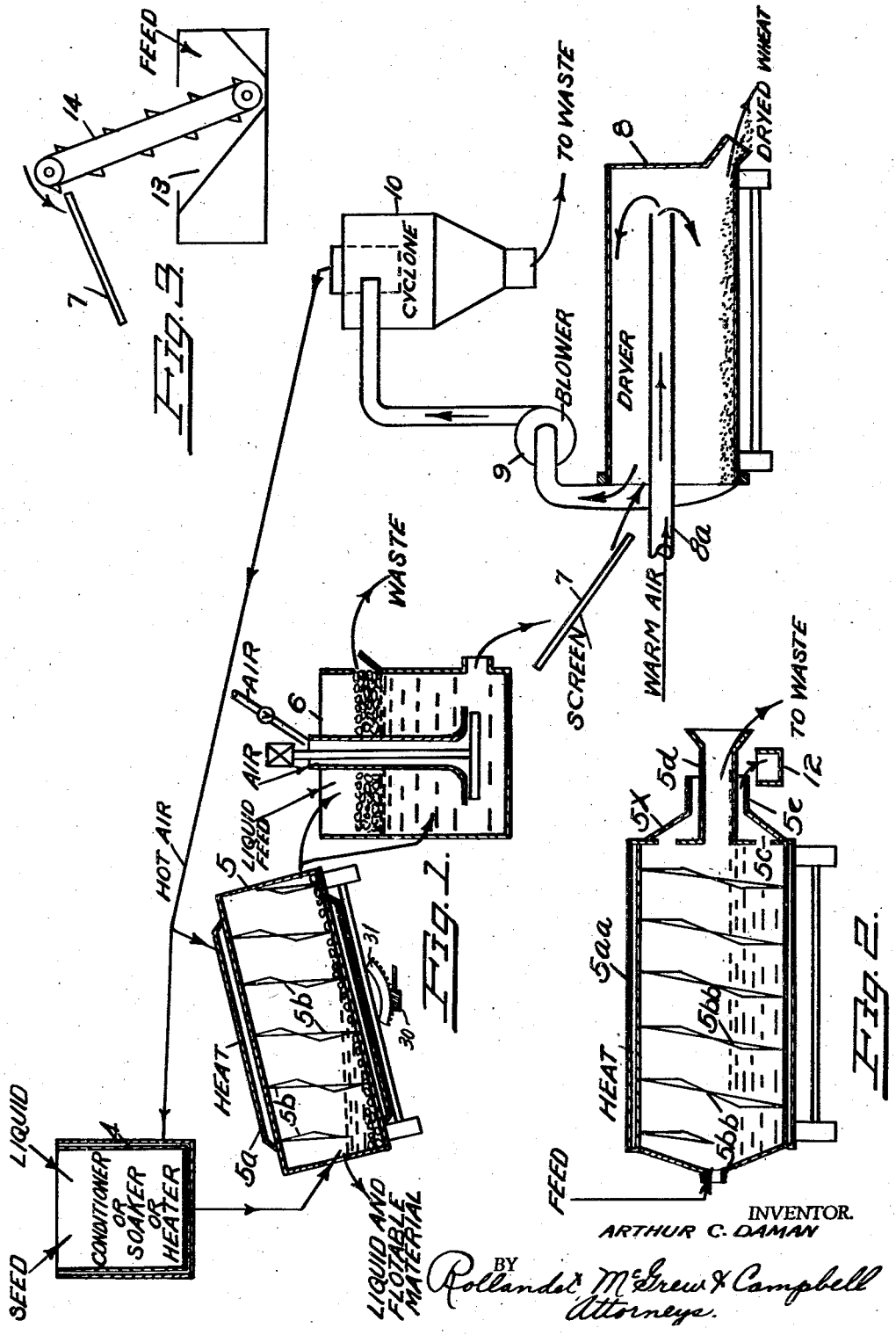
INVENTOR.
ARTHUR C. DAMAN Patented Feb. 5, 1946

2,393,975

UNITED STATES PATENT OFFICE 2,393,975

METHOD OF TREATING CEREAL GRAINS

Arthur C. Daman, Denver, Colo., assignor to Mining Process and Patent Company, Denver, Colo., a corporation of Delaware Application March 27, 1941, Serial No. 385,417

4 Claims. (Cl. 83—28)

This invention relates to the treatment of cereal grains and the like, and more particularly relates to the removal of skin and contaminants from grain kernels to properly condition the kernel content for subsequent processing.

Recent investigations in the flour processing art have been directed to the vitamin content and other food value properties of cereal grains and the like. Such grains are composed of an inner body known as the grain kernel, and a series of encasing skins, the outermost of which constitute the chaff and bran content having little or no food value. The innermost skin adjoining the grain kernel is a tough transparent membrane which adheres to the grain kernel tenaciously. This membrane bears close resemblance to "cellophane" and similar synthetic products possessing excellent water repellent properties.

In certain operations now being undertaken, it has been proposed to clean and beneficiate cereal grains and the like by various methods inclusive of subjecting the skin content to an attrition action for its removal from the grain kernel. Usually such treatments employ water as a liquid suspension vehicle by which the grain is conducted through the various treatment stages of the operation. Such operations are directed to the maximum removal of skin content and in attempting to obtain removal of the more tenaciously adhering membranes on the grain kernels, much of the grain content from which the skin constituents are readily removed is subjected to long intervals of soaking in the liquid suspension medium without having any protective coating.

The vitamin content of cereal grains is for the most part, if not all, water soluble. Consequently, when cereal grains are permitted to stand in liquid for any considerable period with the inner protective skin removed, much of the vitamin content goes into solution passing from the grain kernels and thus becomes wasted in the process.

It is an object of the present invention to provide a method of treating cereal grains in which the individual grain kernels are subjected to a uniform skin-removal action and a uniform period of retention in a liquid carrier vehicle.

Another object of the invention is to provide a method of treatment of cereal grains in which the bran content is removed from the individual grain kernels without removal or injury to the innermost protective skin.

A further object of the invention is to provide a treatment of cereal grains in which a substantial portion of the bran content is removed from the individual grain kernels without depleting the vitamin content of such kernels.

Still another object of the invention is the provision of control methods for heating and soaking cereal grains to provide a substantially uniform removal of a predetermined portion of the bran content of the individual grain kernels.

A still further object of the invention is to exert a close control on the soaking or wetting of grain kernels to differentially wet individual skins and thereby simplify and facilitate the peeling and removal of such skins.

Other objects reside in novel steps and treatments, all of which will appear more fully in the course of the following description.

The present invention is designed primarily for continuous operation in which quantities of a cereal grain and the like in a liquid vehicle are passed progressively through a succession of treatment stages, with the finished product continuously discharging at the tail end of the operation.

While the present invention has particular application to cereal grains such as wheat, barley, rye, corn and oats, it also is suited to the treatment of other vegetable matter such as seed cleaning operations and the like in which contaminants, dirt and weed seeds are separated from the seeds constituting the valuable constituent of the operation.

For purposes of brevity, the expression "cereal grains and the like" will be used in the specification to designate the various classes of material amenable to the methods of the present invention.

In performing the present treatment, the grain is conducted through or introduced into one or more treatment stages in a liquid carrier vehicle, usually water, and preferably the quantity of grain is proportioned to the quantity of water to produce a free flowing pulp.

In preferred practice, excess wetting is to be avoided and for this reason frequent dewatering operations are employed following various treatment stages to hold the immersion duration of the treatment within desired limits.

At an initial stage of the treatment, the grain is subjected to a soaking or wetting action to loosen and at least partially separate the outer skins. Thereafter, the wetted grain kernels are subjected to a controlled attrition influence to complete the separation of the skins from the kernels.

Preferably, this initial separation is concluded by passing the grain through a liquid body. The skins together with contaminating matter, such as bees' wings, dust particles and the like, are free floating compositions which rise to the surface of the liquid vehicle and form a scum. The grain kernels sink in the liquid and are only floated by intense agitation or suitable reagents, and because of these differential properties the skin-loosening treatment is well suited for separate removal of the constituents so separated.

The present invention constitutes a departure from prior practice by employing mechanical means to impart a progressive movement to the submerged grain kernels conjointly with the rotary action inducing attrition and these means are operated to effect discharge of the kernels after a predetermined period of retention within the mill, at which time they are freed of the outer skins but have not been subject to sufficient attrition influences to damage the innermost water repellent skin.

Further provision is made for discharging the grain kernels from the mill at a different elevation than the overflow discharge which carries off excess liquid together with the scum containing bran constituents, bees' wings and the like floating on the surface.

Thereafter, the grain kernel discharge may be subjected to gravity concentration methods such as froth flotation, skin flotation or the like.

The grain concentrated in such manner or if gravity concentration is not employed, the grain kernel discharge of the grinding and soaking stage is then delivered on screens to effect a separation of liquids from solids, after which the solids so separated are passed into a rotary kiln dryer or similar structure and subjected to a dewatering action usually followed by a cyclone separation for removal of entrained chaff and the like which may be adhering to the grain.

In the preferred skin-loosening operation of the present process, the wetting action is performed in conjunction with or as a supplement to a heating action in which the outer surfaces of the individual grains are heated to a temperature well in excess of the temperature at the interior of the kernel.

Thereafter, by the prompt application of a wetting agent to these heated surfaces, such surfaces more readily absorb moisture and an easy and rapid peeling action is thus obtained. In so doing, the grain kernels and protective skins are left undamaged by the operation, and contain a minimum amount of moisture.

From the foregoing, it will be apparent that in addition to affording a close control of the soaking and skin-removal actions, the present invention likewise serves as a method of beneficiation of grains.

Having thus described in general terms the distinctive features of the present invention, reference will now be made to certain typical milling operations embodying the features of the present invention. To this end, reference is now made to the accompanying drawing in the several views of which parts have been designated similarly and in which,

Figure 1 is a diagrammatic flow sheet arrangement showing an entire milling arrangement embodying features of the present invention;

Figure 2 is a diagrammatic side elevation of a modified form of attrition mill for use in a circuit similar to that shown in Figure 1; and Figure 3 is a modified form of another control means for regulating the soaking and attrition actions employed in the process.

The flow sheet of Figure 1 will be described with reference to the treatment of wheat being adapted for flour milling. The wheat as delivered from an elevator, storage bin or the like is introduced into a conditioning tank or hopper 4, which preferably is jacketed for the reception of a heat-exchange gas or liquid.

In the tank 4, the raw grain may be maintained for treatment in either a wet or dry condition. It will be advantageous in many operations to subject it to a preliminary heating at this stage to render the grains and particularly the outer skins thereof more receptive to absorption of moisture during subsequent stages of the treatment.

Where the dry treatment is practiced, the grain after heating in hopper 4 is passed into a tumble mill 5 where it is mixed with sufficient liquid to form a free flowing pulp.

However under some conditions, it may be desirable to employ a limited soaking action and to this end, the grain passing into mill 5 may be sprinkled to effect a surface wetting sufficient to produce the desired peeling or loosening action but not requiring sustained immersion.

When the wet treatment is practiced in the tank 4, the raw grain is mixed with water which is the carrier vehicle of the operation. The proportion of wheat to water is regulated to produce a free flowing pulp. When flotation or other gravity separation is included as a stage of the process, it usually will be desirable to introduce reagent into the tank 4 in advance of the actual float-and-sink requirements of the treatment.

After completion of the conditioning operation in tank 4, the liquid-solids mixture is passed to a tumble mill 5 where it is subjected to heating, soaking and attrition actions. The heating action, although not essential under all conditions, is valuable in promoting soaking and peeling, and thereby reduces the treatment interval with consequent increase in plant capacity of a given size.

To this end, the mill 5 is provided with a jacket 5a for the circulation of a gas or liquid, such as steam for example. However, it will be understood that any regulatable means of heating the contents of the mill may be employed within the spirit and scope of the invention.

Where heating is repeated at this stage, the action again involves heating the outer portion of the individual grains in excess of the temperature in the innermost portions and thus increase water absorption in the outer skins to promote soaking and peeling.

A further control is afforded by the position of mill 5. The inclination may be varied, as by a worm 30 engaging a rack sector 31 attached to the mill, to increase or reduce the size of the pool formed at the discharge end, and thus increase or reduce the contact interval of the grain in water. Likewise the feed inlet and discharge outlet can be changed to vary the volume of material in the mill.

Preferably, spiral flights 5b are located within mill 5 to progressively move the non-floated grain kernels from the inlet to the discharge at a controlled and predetermined speed. Likewise, the mill is preferably mounted with its lengthwise axis inclined to permit an overflow discharge at one end and a solids discharge at its opposite end, and thus provide a de-watering action.

By determining the pitch of flights 5b with reference to a standard rate of rotation for the mill, it is possible to maintain a uniform interval of grain retention in the mill. Further, by varying the rate of rotation, it is possible to take off more or less skins from the grain kernels as the given operation requires.

The grain discharged from mill 5 next passes into one or more flotation cells 6 where adhering and entrained impurities responding to the action of the reagent rise to the surface and collect in a froth which is removed by overflow and passed to waste.

The flotation cells 6 preferably are of the type having a controllable gas supply for aeration delivered both by pressure and suction. Water may be mixed with the grain passing from mill 5 to provide the proper pulp consistency for flotation, and the feed to cells 6 may be introduced through the froth bed or into the lower part of the cells as preferred.

The solids residue of the flotation separation discharges onto a screen 7 to separate liquid from solids, with the solids so separated passing into a dryer 8, preferably of the rotary kiln type, for the removal of moisture from the grain. The solids discharged from the dryer 8 constitute the final product of the operation.

Warm air or other heated gas is delivered into dryer 8 by a conduit 8a, and a blower 9 exhausts the warm moisture-laden air and passes the same into a cyclone 10.

The rapid movement of the gas through dryer 8 serves to separate and withdraw chaff or other light solid matter remaining in the grain after the prior separations. As a result of this final cleanup, the discharging grain is substantially free from contaminants and in an ideal condition for flour milling or other processing because its vitamin content remain unimpaired.

The chaff and other solids drawn into cyclone 10 are discharged therefrom to waste, while the heated gas discharge may be circulated to the jacket 5a of mill 5 and utilized as the heat source therefor.

From the foregoing, it will be apparent that the present invention provides a simple, efficient and economical process for the cleaning and beneficiation of cereal grains.

While the mill 5 of Figure 1 is entirely satisfactory to provide the controlled movement of grain kernels and the separate discharge of contaminants and grain kernels, it will sometimes be more convenient to mount the mill in a horizontal position and such an arrangement has been illustrated in Figure 2.

In this form the mill 5x has an external jacket 5aa and internal spiral flights 5bb. A discharge trunnion 5d supported from the shell of mill 5x provides the discharge outlet of the contaminants. A second discharge outlet or trunnion 5e encompasses trunnion 5d for delivery of the cereal grain from the mill which enters the outlet passage through openings 5c. In preferred practice, the mill will have adjustable diaphragm openings at both the feed inlet and discharge outlets to afford a close control of the separation.

The discharge from outlet 5e is delivered into a launder 12 or other suitable conveying means, while the discharge from trunnion 5d passes to waste.

The interval of grain retention in mill 5x is also controlled by the rate of rotation and by the pitch of flights 5bb. Similarly the heat supply may be derived from any controlled source, and as a consequence a selective predetermined soaking and skin-removal can be had.

Another form of apparatus also satisfactory for providing the desired attrition and soaking has been illustrated in Figure 3. In this apparatus, the grain pulp is fed into a tank 13 having an inclined bottom. A bucket elevator 14 of the endless type is mounted for intake adjacent the bottom of tank 13 and discharges onto a screen 7 above the tank where the water separated by the screen may be returned to the tank, if desired.

Also, if desired, the tank 13 may be provided with an overflow (not shown) for removal of contaminant solids and excess liquid.

The agitation induced by the elevator 14 within the tank 13 and in the buckets provides the necessary attrition and soaking is controlled by rate of movement of elevator 14 with the result that the grain kernels discharging onto screen 7 have their bran content removed.

In all these forms, provision has been made for a uniform interval of retention of the grain kernel content in the liquid, and the attrition and soaking actions are controlled to the end that upon discharge, the individual grain kernels have the desired number of skins removed without damage to the innermost protective covering which functions to retain the water soluble vitamin content in the grain kernel.

Inasmuch as the action in the mills or elevator provides a separation and separate discharge of grain kernel from bran content and contaminant matter, a subsequent separation as by flotation or the like is unnecessary in many instances.

This is particularly so because the hot air blast in the dryer of the dewatering operation serves to effectively remove substantial quantities of chaff or other contaminant matter which, because of its light weight, passes out of the treatment with the air stream, while the heavier grain kernels will not pass into suspension in the air stream and hence are discharged separately from the chaff at the end of the drying treatment.

In all of these operations, the control of the soaking and attrition actions coupled with the control of the separations, insures a final products of uniform grade and character.

Features of the apparatus and mechanism disclosed but not claimed herein are being made the subject matter of another application, while the claims of the present application are directed to the treatment steps irrespective of the type of apparatus employed in such treatment.

Changes and modifications may be availed of within the spirit and scope of the invention as defined in the hereunto appended claims.

What I claim and desire to secure by Letters Patent is:

1. In a method of cleaning and husking cereal grain by differentially wetting contaminant matter and the skins of grain to loosen and separate the same from associated grain kernels under the action of attrition influences, the steps of mixing such grain and contaminant matter with a quantity of water only sufficient to float off said skins and to compel mutual rubbing action between adjacent grain kernels which sink in said liquid; moving said settled grain at slow speed progressively through and out of said liquid body, independently of the rate or direction of movement of skins and contaminant matter floating on the surface of said liquid body, whereby to provide a period of attrition and submergence of substantially all the grain kernels of sufficient duration to insure substantially complete removal of the outer skins of the grain; and discharging the husked grain kernels from the treatment at a higher elevation than the surface of said liquid body.

2. In a method of cleaning and husking cereal grain by differentially wetting contaminant matter and the skins of grain to loosen and separate the same from associated grain kernels under the action of attrition influences, the steps of mixing such grain and contaminant matter with a quantity of water only sufficient to float off said skins without removal of or injury to the innermost protective skin and without depleting the vitamin content of the grain kernels, and to compel mutual rubbing action between adjacent grain kernels which sink in said liquid; moving said settled grain at slow speed progressively through and out of said liquid body, independently of the rate or direction of movement of skins and contaminant matter floating on the surface of said liquid body, whereby to provide a period of attrition and submergence of substantially all the grain kernels of sufficient duration to insure substantially complete removal of the outer skins of the grain; varying the time of submergence of said grain by varying the inclination of the path of progressive grain movement; and discharging the husked grain kernels from the treatment separately from other solids at the end of said progressive movement.

3. A method of treating cereal grains to remove a substantial portion of the bran content of individual grain kernels without removal or injury to the innermost protective skin and without depleting the vitamin content of such kernels, which comprises subjecting said grains to a controlled soaking and attrition action by positively moving said grains through a body such as water and along an inclined path, at a predetermined rate so as to subject said kernels to such soaking and attrition action for a predetermined time during which only the outer bran layers are removed and the innermost protective skin is neither removed nor injured and also a sufficiently short period of time so that the vitamin content of such kernels is not depleted; removing said grains from said body of liquid at the upper end of said inclined path so as to permit liquid to drain therefrom; removing floatable bran husks and contaminant matter from the opposite end of said path by overflow from said body of liquid; and further treating said grains to remove loosened but adhering and entrained matter, said further treatment including subjection to a blast of heated air to dry said grains and blow away the lighter bran husks and entrained matter.

4. A method of treating cereal grains as defined in claim 3, in which said grains, prior to being subjected to said air blast, are submerged in a second body of water and subjected to agitation and aeration, to remove entrained and loosened bran husks and contaminant matter.

ARTHUR C. DAMAN.